Patented Aug. 7, 1928.

1,680,111

UNITED STATES PATENT OFFICE.

IWAN OSTROMISLENSKY, OF NEW YORK, N. Y., ASSIGNOR TO THE PYRIDIUM CORPORATION, OF NEW YORK, N. Y., A CORPORATION OF NEW YORK.

PHENYL-AZO-ALPHA-ALPHA-DIAMINO-PYRIDINE DIHYDROCHLORIDES AND METHOD OF OBTAINING THE SAME.

No Drawing.   Application filed September 23, 1927. Serial No. 221,629.

This invention is an improvement in methods of obtaining phenyl-azo-alpha-alpha-diaminopyridines, and more particularly in methods of obtaining the di-hydrochlorides.

Formerly it was believed that alpha-alpha-diaminopyridine functioned as a mono-acid base, in spite of the fact that its molecule contains three nitrogen atoms. It was believed that two of the nitrogen atoms had presumably lost their basic properties. Chichibabin succeeded in separating, under various conditions, only mono-hydrochloride of diaminopyridine. He also considered that the molecule of sulphuric acid binds two molecules of alpha-alpha-diaminopyridine.

Notwithstanding all his efforts, Chichibabin was unable to obtain either the salts or the nearest derivatives of alpha-alpha-diaminopyridine as a di- or tri-acid base. Thus, for instance, according to Chichibabin, the phenyl-azo-alpha-alpha-diaminopyridine, melting point 137° C., invariably forms under the action of hydrochloric or picric acid, only mono-hydrochloride, or mono-picrate.

It is sulphuric acid which in every instance binds the two molecules of phenyl-azo-diaminopyridine. On the strength of numerous observations made by Chichibabin in the course of several years, it was generally accepted in the literature that only one of the three atoms present in the alpha-alpha-diaminopyridine molecule displays basic properties peculiar to pyridine compounds. According to Chichibabin these peculiarities constitute a sharp demarcation line between the amines of the pyridine and those of the aromatic series, and in particular between diaminopyridines and phenylene-diamines. In his book "Investigations in Pyridine Bases, 1918, Moscow" Chichibain among the fundamental deductions mentions the following: Of the three nitrogen atoms in diaminopyridine and its derivatives, one alone displays basic properties.

Contrary to Chichibabin's observations I was able to show that phenyl-azo-alpha-alpha-diaminopyridine functions not only as a mono-acid but likewise as a di-acid base. Chemically pure phenyl-azo-alpha-alpha-di-aminopyridine dihydrochloride, which I succeeded in separating off, comes in the form of beautiful small prisms, dark red in color with a violet tinge, of high refraction and which shimmer. Under the action even of cold water these compounds split off one molecule of hydrochloric acid and are transformed to beta and gamma phenyl-azo-alpha-alpha-diaminopyridine mono-hydrochloride.

Probably it was precisely this hydrolysis which occurs in the di-hydrochloride of this substance, that prevented Chichibabin from separating off analogous compounds. In washing the various compounds he had obtained with water, Chichibabin used inevitably to decompose the di-salts and was thus unable to discover the existence of these salts. As concentrated and even 6% hydrochloric acid does not decompose dihydrochloride, this compound is easily produced by means of simple copulation of diazotized aniline with alpha-alpha-diaminopyridine, of course provided the solutions of these substances be sufficiently concentrated and contain a sufficient amount of hydrochloric acid (not less than 6%).

My method of obtaining phenyl-azo-alpha-alpha-diaminopyridine dihydrochloride considerably facilitates and simplifies the procedure of separating off the corresponding mono-hydrochloride, i. e. pyridium. The product resulting from the copulation process is separated off directly in chemically pure condition and in the form of the above-mentioned characteristic prisms. As this substance displays high specific gravity, it precipitates readily in the container in which the reaction is conducted. As distinguished from almost amorphous micro-crystalline mono-hydrochloride (pyridium) in powder form, which displays colloidal properties, it is easily and very rapidly filtered under pressure and is likewise very easily separated off from its mother liquor on a centrifuge; the residue which it has adsorbed being easily removed by washing the substance in a weak, say 10%, solution of hydrochloric acid.

The mixture of beta and gamma isomers of phenyl-azo-alpha-alpha-diaminopyridine monohydrochloride, called pyridium may be obtained by pouring distilled water at room temperature over the dihydrochloride after it has been purified in the above described way. In this process the dihydrochloride immediately and quantitatively splits off the molecule of hydrochloric acid and is thus converted to chemically pure monohydrochloride, i. e. pyridium. The latter substance is then separated off either by centrifuging or by filtration under pressure and washed in a small amount of ice water and dried to constant weight in a temperature of 40°–60° C. This new method of separating the mono-hydrochloride enables the elimination of recrystallizing the crude product from cold water, which entails considerable loss of the substance.

Example I.

5191.28 gms. of freshly-distilled aniline are dissolved in a mixture of 14 litres of 37% hydrochloric acid and 24 litres of distilled water. About 10 kilograms of ice must then be added to the solution. The diazotization process is conducted by means of a solution of 3798 gms. of 90% sodium nitrite in 30 litres of water at 12° C. approximately. Of course the process is checked with iodo-starch paper. When the diazotization is completed a solution of 6000 gms. of alpha-alpha-diaminopyridine in 30 litres of 20% hydrochloric acid is added at one time into the product obtained.

I found by experience that the temperature of the freshly-prepared mixture should not be allowed to fall below 12° C. However, the most favorable temperature for this reaction is 16- to 18° C. Only at this relatively high temperature after diazotization does the mixture, when it has been allowed to stand for some 30–120 minutes, give a copious sediment of phenyl-azo-alpha-alpha - diaminopyridine di-hydrochloride, (the beta and gamma isomers); it precipitates rapidly to the bottom of the earthenware or porcelain container in which the reaction is conducted. This sediment is first separated off on a centrifuge whose surface must be covered with bakelite or any other acid-proof varnish and then washed in 10% hydrochloric acid and dried with air in a drying closet to constant weight at 30–45° C.

Properties of the dihydrochloride.

As distinguished from the mono-hydrochloride the substance which is obtained in the above-described way, dissolves very readily in cold pyridine; the solution is deep red in color. Consequently, the basic properties are more pronounced in phenyl-azo-alpha-alpha-diaminopyridine than in pyridine. On the other hand, solutions made with cold aniline are yellow in color with a slight reddish tint. Most likely these solutions contain free phenyl-azo-diaminopyridine and aniline hydrochloride. This substance dissolves easily in methyl and ethyl alcohol; in benzene and anhydrous acetone it is almost insoluble; when boiled with benzol (83° C.) it retains both its crystalline form and its glitter. In contradistinction to the mono-hydrochloride, the dihydrochloride dissolves very rapidly in lukewarm water. But even if cold water is poured over it, it immediately loses its glitter and crystalline form, and is converted to mono-hydrochloride, i. e. pyridium. As distinguished from the aqueous solutions of the mono-hydrochloride, the dihydrochloride solutions show a distinct acid reaction to Congo paper.

Under the action of ammonia, dihydrochloride in powder form immediately changes its violet red color to a golden yellow and is transformed to free phenyl-azo-diaminopyridines which melt at 139° C. after a triple recrystallization from boiling water.

Concentrated and even 6% hydrochloric acid does not produce any action on dihydrochloride, but it decomposes partially under the action of 4–5% hydrochloric acid, forming the mono-hydrochloride. A part of the original crystals remain unchanged in this reaction. 3% hydrochloric acid decomposes dihydrochloride to the mono-hydrochloride and free hydrochloric acid. The reaction takes place gradually but quantitatively. It takes three days to be completed. If heated in a test tube in an oil bath, chemically pure dihydrochloride at 180–210° C. splits off one molecule of hydrochloric acid and is converted to the mono-hydrochloride. In this reaction the original dihydrochloride crystals lose their glitter and become dull, although retaining their original shape. The resulting product (pyridium) yields perfectly neutral solutions with boiling water.

In this heating process (180–210° C.) dihydrochloride splits off its recrystallization water which can be collected in a container and the amount of hydrochloric acid split off can be ascertained by means of silver nitrate. Under the same conditions pyridium (180–210° C.) gives no water at all and splits off only a negligible quantity of hydrogen chloride in traces. If heated in a capillary tube over a slow fire, dihydrochloride begins to split off hydrochloric acid perceptibly only at 180° C. The complete decomposition and coagulation temperatures for both compounds (i. e. mono- and dihydrochloride) in the process of heating in a capillary tube, lie around 220–224° C.

If desired, this dihydrochloride may be obtained in chemically pure condition by means of a reaction conducted under certain conditions between hydrochloric acid and prepared mono-hydrochloride. In this process the temperature as well as the concentration of the mono-hydrochloride and hydrochloric acid in the original solution are of the greatest importance.

*Example II.*

10 gms. of mono-hydrochloride are heated to boiling point with 100 cc. of 10% hydrochloric acid. In a short while the original powder which looks to be amorphous takes on the characteristic crystalline form and is quantitatively transformed to the corresponding dihydrochloride. Even 7–8% hydrochloric acid brings about this conversion without decomposing the dihydrochloride at a temperature as low as 80–100° C.

The conversion of mono-hydrochloride to dihydrochloride, as described in Example II, shows that the substance which I have separated off and am describing in the present application cannot display the structure of the corresponding dihydrochloride of the diazo-amido compound.

For though the conversion of the said diazo-amido compound to an azo-amine compound (pyridium) is very easily performed, as described in my application Serial No. 221,628, of even date herewith, namely just by heating it with water, yet the conversion of the azo-amido compound back to the diazo-amido one cannot actually be done. The reaction:

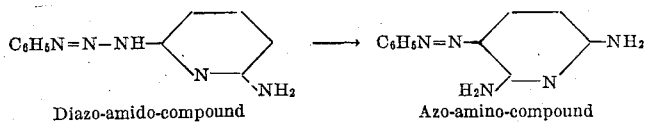

Diazo-amido-compound → Azo-amino-compound is not reversible.

Consequently, the new substance which I succeeded in separating off must without doubt display the structure of a phenyl-azo-alpha-alpha-diaminopyridine dihydrochloride.

As has already been mentioned in the text of the present application the new compound which I separated off facilitates and reduces the cost of the process of obtaining mono-hydrochlorides, that is pyridium, as already described by me, to quite a considerable extent. The procedure of obtaining the mono-hydrochloride from the dihydrochloride is as follows:

*Example III.*

Into 3 kilograms of dihydrochloride placed in an earthenware container, 70–100 litres of distilled water are added at normal temperature, the resulting mixture is then vigorously mixed for 10–30 minutes and filtered off under pressure or by centrifuging. The chemically pure mono-hydrochloride which is obtained by this process is washed in a small amount of distilled water and then dried in air the temperature of which is regulated in any suitable manner to constant weight at 30–45–55° C. If handled with water in the proper way the resulting product will give perfectly neutral solutions. The mother liquor and washing waters, which remain after the mono-hydrochloride has been separated off, may be treated with ammonia, and the pyridium base, that is, the beta and gamma isomers of phenyl-azo-alpha-alpha-diamino-pyridine that appears in this reaction is carefully filtered off and washed in large quantities of distilled water, then drained and converted to mono-hydrochloride by recrystallizing it out of 3% hydrochloric acid. The total yield of mono-hydrochloride reaches as high as 99.3% of the theory.

A closer investigation of the mono-hydrochloride obtained as described in Example III shows, that whilst being but slightly toxic it displays very strong bactericidal properties. It dissolves quite easily in boiling water and the 1 to 2.5% aqueous saturated solutions made with it display considerable stability. In all its chemical, physical, biochemical, biological, bacteriological and therapeutic properties and constants this product is identical with the substance termed pyridium.

The behavior of aniline homologues and analogues, such as phenetidine, anisidine, toluidine, in copulation with alpha-alpha-diaminopyridine is analogous with that of aniline itself. In this connection we shall not touch upon the question of the formation of the isomeric forms (beta and gamma). I have merely observed that under the same conditions these amines produce the dihydrochloride of the corresponding aryl-azo-alpha-alpha-diaminopyridines. In turn these dihydrochlorides are converted by treatment with water to the corresponding mono-hydrochlorides.

My experience, however, has shown that among its analogues and homologues pyridium itself, whilst displaying the lowest toxicity, produces the strongest bactericidal action. Moreover, pyridium dissolves in water much more readily.

The dihydrochloride of phenyl-azo-alpha-alpha-diaminopyridine as described in this application, and the existence of which could not be foretold a priori, presents a certain interest for the following reasons:—

1. By means of the given dihydrochloride, the monohydrochloride of phenyl-azo-alpha-alpha-diaminopyridine, that is, pyridium, in chemically pure condition, may be easily and quickly obtained from aniline and diaminopyridine, as has already been pointed out.

2. Very impure pyridium may be easily purified by converting it to crystalline dihydrochloride and therefrom decomposing it into pyridium, that is, the monohydrochloride, by means of distilled water.

3. In reaction with distilled water, the dihydrochloride of phenyl-azo-alpha-alpha-diaminopyridine instantly splits off one molecule of hydrochloric acid, and is thereby converted into monohydrochloride of phenyl-azo-alpha-alpha-diaminopyridine, that is, pyridium. The pyridium so produced is distinguished from pyridium obtained in the ordinary way, in that it dissolves relatively more easily in cold water. In this way it becomes possible to obtain very strong and probably supersaturated solutions of pyridium, say 3% solutions, which are fairly stable, whereas, strong solutions of pyridium (3%) obtained without the aid of dihydrochloride are distinguished by their excessive instability. They form very rapidly and easily a sediment of pyridium.

4. In addition the dihydrochloride may be used in substantially the same manner as the monohydrochloride, that is, in the treatment of diseases caused by bacterial infection, the procedure with dihydrochloride being substantially the same as that with the monohydrochlorides. The statements in regard to structure are largely theoretical and are not intended as limitations.

What is claimed as new is:—

1. As an article of manufacture, phenyl-diazo-alpha-alpha-diaminopyridine dihydrochloride having the following characteristics: fine needle-like silky glistening crystals with violet shading.

2. The method of obtaining dihydrochlorides of phenyl-azo-alpha-alpha-diaminopyridine, which consists in treating the corresponding mono-hydrochloride (pyridium) with not less than 10% of hydrochloric acid.

Signed at New York, in the county of New York and State of New York, this 20th day of Sept., A. D. 1927.

IWAN OSTROMISLENSKY.